(12) United States Patent
Chatterjee et al.

(10) Patent No.: US 8,037,088 B2
(45) Date of Patent: Oct. 11, 2011

(54) CHANGE MANAGEMENT

(75) Inventors: Ramkrishna Chatterjee, Nashua, NH (US); Marco Carrer, Reading, MA (US); David Mor, Merrimack, NH (US); Chen Zhou, Holden, MA (US); Amit Dhuleshia, North Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 12/317,348

(22) Filed: Dec. 22, 2008

(65) Prior Publication Data

US 2010/0161645 A1 Jun. 24, 2010

(51) Int. Cl.
*G06F 7/00* (2006.01)
*G06F 17/30* (2006.01)

(52) U.S. Cl. ........ 707/769; 707/796; 707/803; 709/206; 709/217; 709/219; 715/753; 715/751

(58) Field of Classification Search .......... 707/769, 707/796, 803; 709/206, 217, 219; 715/753, 715/751; 726/1
See application file for complete search history.

(56) References Cited

U.S. PATENT DOCUMENTS

| | | | | |
|---|---|---|---|---|
| 6,438,594 | B1 * | 8/2002 | Bowman-Amuah | 709/225 |
| 7,065,553 | B1 * | 6/2006 | Chesley et al. | 709/205 |
| 7,386,797 | B1 | 6/2008 | Chatterjee et al. | |
| 2002/0087476 | A1 * | 7/2002 | Salas et al. | 705/59 |
| 2003/0131073 | A1 * | 7/2003 | Lucovsky et al. | 709/219 |
| 2004/0267822 | A1 * | 12/2004 | Curran et al. | 707/200 |
| 2006/0053380 | A1 * | 3/2006 | Spataro et al. | 715/753 |
| 2007/0124373 | A1 | 5/2007 | Chatterjee et al. | |
| 2007/0214216 | A1 | 9/2007 | Carrer et al. | |
| 2007/0277148 | A1 * | 11/2007 | Venolia | 717/101 |
| 2009/0172558 | A1 * | 7/2009 | Pickens et al. | 715/741 |

OTHER PUBLICATIONS

Huang et al.—"Utilizing Supporting Evidence to Improve Dynamic Requirements Traceability"—Aug. 29-Sep. 2, 2005 (pp. 135-144).*
Andreas Jedlitschka & Klaus-Dieter Althoff—"Case-Based User Modelling in an Experience Management System" 2003, Citeseer psu.edu (pp. 1-7).*

* cited by examiner

*Primary Examiner* — John E Breene
*Assistant Examiner* — Anh Ly
(74) *Attorney, Agent, or Firm* — Kraguljac & Kalnay, LLC

(57) ABSTRACT

Systems, methods, and other embodiments associated with artifact type neutral change management are described. One example method includes maintaining an access table for each artifact in a collaborative software environment that records a most recent access of an artifact on a per user basis. An artifact type registration table is also maintained that maps each artifact type to the access table that records access information for artifacts of the given type and to a data store that stores artifacts of that type. For a given user, artifact pair, queries on the type registration table, access table, and data store are generated to return the last modification time for the artifact and the user's last access time for the artifact. This information is used to determine a change status of the artifact for the given user. This common framework can be used for artifacts of any type that are registered in the type registration table.

28 Claims, 5 Drawing Sheets

Data Store (Artifact Table)
file_table

| artifact id | last mod time | last mod user | container id |
|---|---|---|---|
| F06 | 120356 | user271 | projecta |
| F07 | 052745 | user007 | projecte |
| ... | | | |
| F95 | 995540 | user420 | projectc |
| ... | | | |
| F98 | 236952 | user276 | projectb | access_table_A

| artifact id | last access time | viewer id | change status |
|---|---|---|---|
| F06 | 120375 | user271 | read |
| F06 | 120222 | user007 | read |
| F06 | 130561 | user332 | unread | access_table_B

| artifact id | last access time | viewer id | change status |
|---|---|---|---|
| M05 | 995555 | user271 | read |
| ... | | | |
| M95 | 992274 | user271 | read | type_registration_table

| artifact_type | data source | access_table |
|---|---|---|
| file | file_table | access_table_A |
| mail | mail_table | access_table_A |
| ... | | |
| task | task_table | access_table_B |
| ... | | |
| meeting | meet_table | access_table_B | contained_type_registration_table

| container_type | artifact_type |
|---|---|
| folder | folder |
| folder | file |
| ... | |
| task list | task list |
| task list | task |
| ... | |

Figure 4

CHANGE MANAGEMENT

BACKGROUND

In a collaborative software environment, change management refers to the process of tracking changed artifacts such as messages, files, and tasks. The "change status" of each artifact is tracked as it transitions through the following states: new, read and unread. Efficient change management is important for reducing information overload on users in collaborative software environments because it flags for the user those artifacts that are new or have been modified since the last time the user accessed them. In this manner, the user is able to identify and focus on those artifacts that convey new information.

Typically, as new types of artifacts are added to a collaborative software environment, a change management system tailored to the particular properties of the new artifact type is developed in an ad hoc manner. Having independently implemented and operating change management algorithms results in relatively high implementation and maintenance costs.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 illustrates another example embodiment of a collection of data tables used in a system associated with artifact type neutral change management.

DETAILED DESCRIPTION

Figure 1:
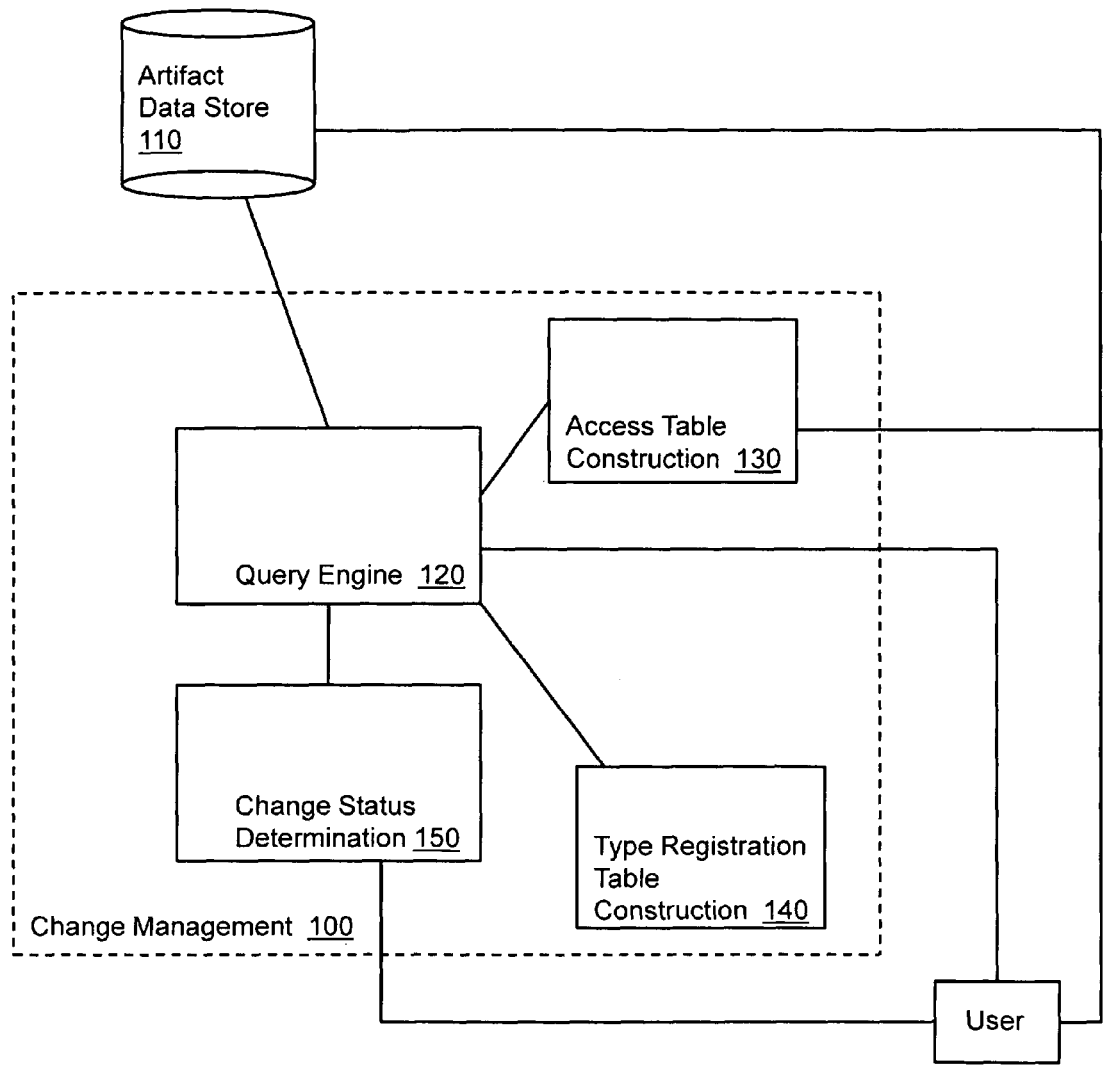
FIG. 1 illustrates an example embodiment of a method associated with artifact type neutral change management.

The type neutral change management systems and methods, or change manager, described herein provide a unified framework for change management of artifacts of any type. The disclosed change manager obviates implementing change management from scratch for each artifact type. It separates the artifact-type-neutral change manager from any artifact-type-specific modules that may also need to be implemented. The artifact-type-neutral change manager can be reused across artifact types. This reduces implementation and maintenance overheads. The common framework presented herein does not require data duplication or data collocation nor does it introduce any physical constraints on artifact data storage.

The change manager described herein includes an access data repository, such as a relational database table, that stores information for each artifact about a most recent access time on a per user basis. The change manager also includes a type registration data repository, such as a relational database table. The type registration data repository stores information for each artifact type about a common data store where each modification of an artifact by any user is recorded. In one example embodiment, there is a row for each artifact in the common data store. The row includes a last modification time column that is updated whenever the artifact is modified by any user. In addition, the type registration data repository stores the particular access data repository that stores data for each type of artifact. Both of these data repositories can store data about multiple artifact types and as such are artifact type neutral.

The common data store may store artifacts of many types or it may store artifacts of a single type. However, the change manager can utilize any data store as long as the data store exposes for querying data regarding a modification time. The change manager generates queries on the access data repository, the type registration data repository, and the common data store to return information about recent access of a given artifact with respect to a given user. Information about a most recent modification of the artifact by any user is also returned by the change manager's queries. This returned information is used to determine a change status for the artifact with respect to the user. In this manner, the change manager is able to determine a change status for an artifact of any type recorded in the type registration data repository.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a non-transitory computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL), an OQL, a natural language, and so on.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a change management system 100. The system 100 is able to access one or more artifact data stores 110 that store, for each artifact, a last modification time for the artifact. The artifact data store 110 may be a SQL data source table or view that exposes a last modification time for each artifact. The artifact data store 110 may also expose data concerning a last modifying user and a container in which the artifact is stored. The data columns may be exposed through a view over the artifact data store if any of the exposed data is the result of a computation. It can be seen that multiple artifact types may be stored in the same data store or physical table.

The change management 100 system includes access table construction logic 130. The access table construction logic records access information in an access table. The access information includes an access time, a user identifier, and an artifact identifier for each artifact accessed by a user. The access information may also include a user-assignable change attribute that can be set by a user. For example, the user-assignable change attribute may allow a user to mark an artifact as unread when the artifact has been viewed by the user. Conceptually speaking, for each user the access table stores a row for each artifact of this type accessed by the user. The row contains, among other values, the time when the user last accessed the artifact. When a user accesses an artifact for the first time, a row is inserted in the access table for the user, artifact pair. On subsequent access, the same row is updated to keep track of the change status for the artifact for the user. The change status in this row will usually correspond to a "read" change status. However, the user may be able to mark the artifact as "unread" via the user-assignable change attribute. Various partitioning schemes can be used to control the growth of this table, for example, "old" partitions can be regularly purged. It can be seen that multiple artifact types can share the same access table.

The change management system 100 includes a type registration table construction logic 140 that maintains a type registration table that identifies, for each artifact type, a data store that stores artifacts of that artifact type. The type registration table construction logic 140 also maps artifact types to an access table that records access information for artifacts of the artifact type. It can be seen that the type registration table can store information about multiple artifact types.

The change management system 100 includes a query engine 120 that generates dynamic PL/SQL (Procedural Language/Structured Query Language) queries. To determine a change status for a given user, artifact pair the query engine 120 generates and executes a query on the type registration table to return a data source and access table associated with the artifact type. The query engine 120 generates and executes a query on the data stores to determine a last modification time for the artifact. The query engine 120 generates and executes a query on the access table to return the user's last access time for the artifact. The last access time and last modification time are passed to a change status determination logic 150.

The change status determination logic determines a change status for the user, artifact pair based on the last modification time and the last access time and provides the change status to the user. For example, if there is no row in the access table for the user, artifact pair, the change status determination logic determines a change status of "new." If the access table includes the user-assignable change attribute and this attribute has been assigned the value of "unread" the change status determination logic determines a change status of unread. Otherwise, if the user's last access time for the artifact is earlier than the last modification time of the artifact, the change status determination logic determines a change status of "unread." If the user's last access time for the artifact is not earlier than the last modification time of the artifact, the change status determination logic determines a change status of "read."

Figure 2:
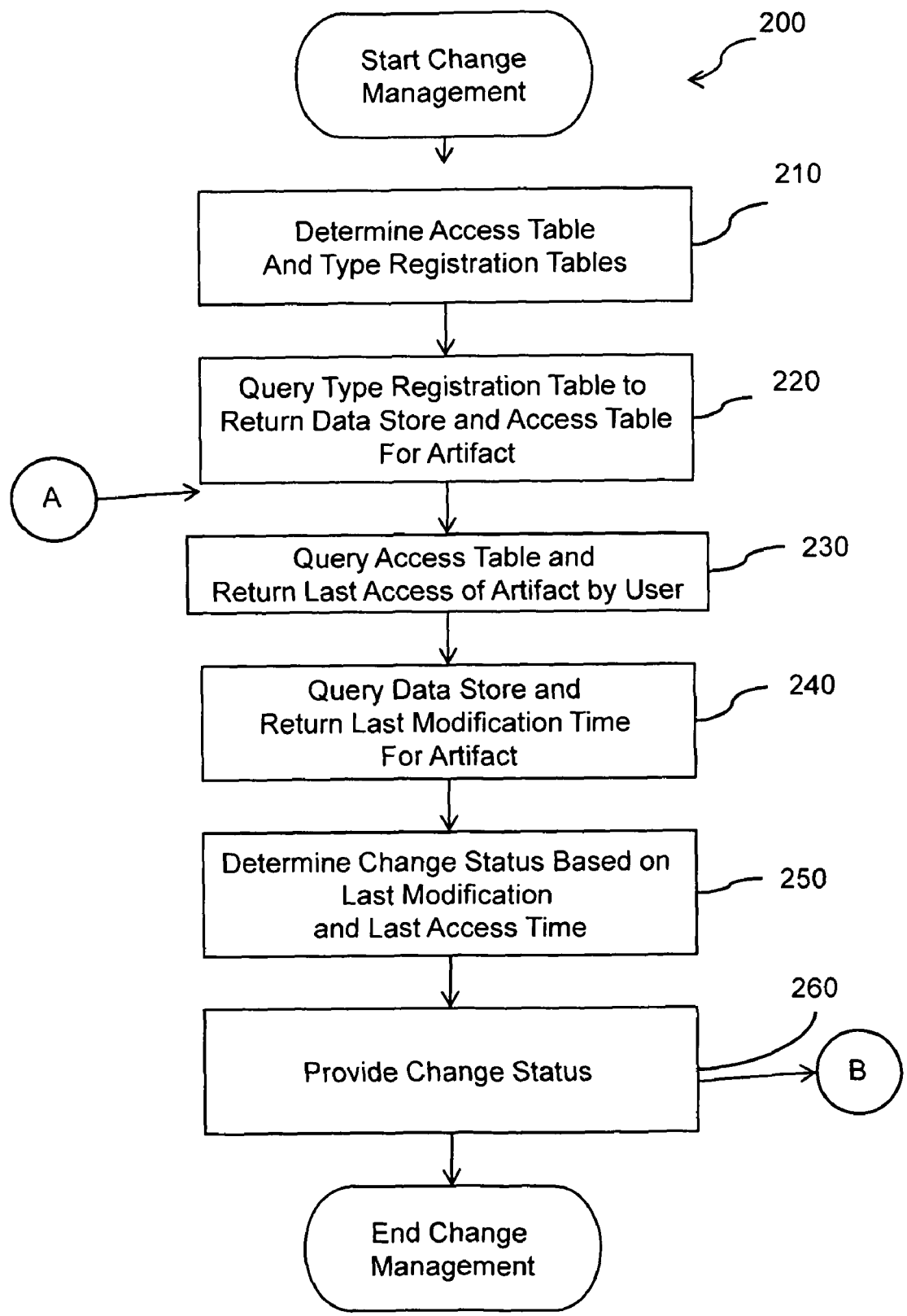
FIG. 2 illustrates another example embodiment of a method associated with artifact type neutral change management.

FIG. 2 illustrates an example embodiment of a change management method 200 that returns a change status for a user, artifact pair. At 210 an access table is determined that records access information. The access information includes an access time, a user identifier, and an artifact identifier for each artifact accessed by a user. The access information may also include a user assignable attribute as discussed above. A type registration table is also determined that maps each artifact type to a data store for the artifact type and an access table that records access information for artifacts of the artifact type. At 220, the type registration table is queried to return a data store and access table associated with the artifact type for the artifact in the user, artifact pair. The access table is queried at 230 to return a last user's last access time for the artifact. If a last access time is returned as a result of the querying of the access table, at 240 the data store is queried to return a last modification time for the artifact. At 250 a change status for the given user, artifact pair is determined based on the last modification time and the last access time. At 260 the change status is provided for the given user, artifact pair.

While FIG. 2 illustrates various actions occurring in serial, it is to be appreciated that various actions illustrated in FIG. 2 could occur substantially in parallel. By way of illustration, a first process could construct the access and type registration tables, a second process could query the access and type registration tables and the data store, and a third process could determine the change status. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes maintaining type registration and access tables and querying those tables to determine a change status for an artifact. While executable instructions associated with the above method are described as being stored on a computer-readable medium, it is to be appreciated that executable instructions associated with other example methods described herein may also be stored on a computer-readable medium.

In one example, data structures may be constructed that facilitate storing data on a computer-readable medium and/or in a data store. Thus, in one example, a computer-readable medium may store a data structure that includes, a first field for data associated with a user's last access time for the artifact, a second field for data associated with a user-assignable change attribute, a third field for data associated with a last modification time of the artifact, and a fourth field for data associated with identification of a data store and a table that stores last access time data for artifacts of various types. With this "raw" data available, the data structure may also include a fifth field for storing a change status data that is derived from data located in one or more of the first through fourth fields. While five fields are described, it is to be appreciated that a greater and/or lesser number of fields could be employed.

Figure 3:
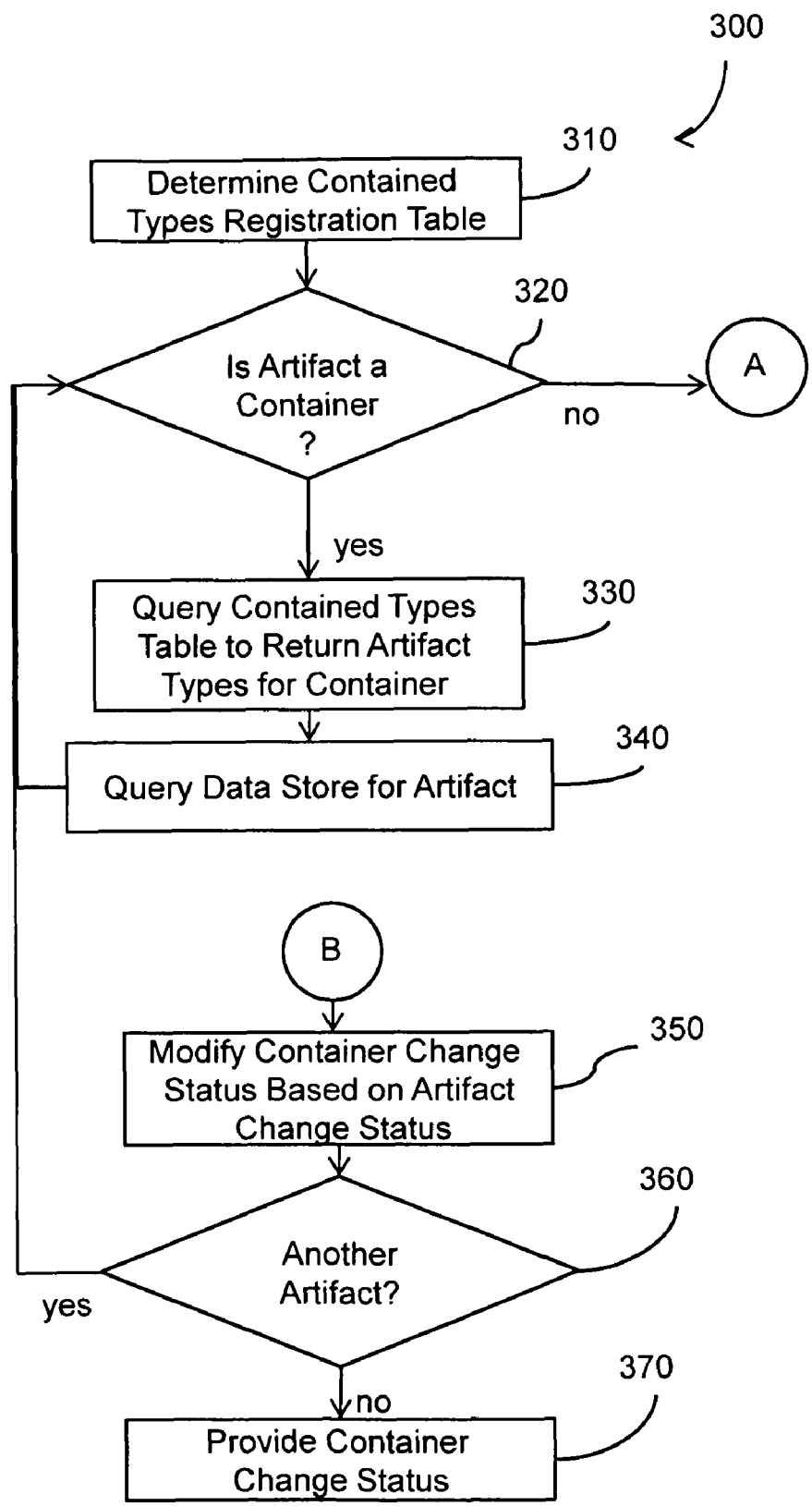
FIG. 3 illustrates an example embodiment of a system associated with artifact type neutral change management.

FIG. 3 illustrates an example method 300 that determines a change status for a container of artifacts. A container is an entity whose primary purpose is to act as a container for other artifacts. For example, a calendar is a container for meetings, a task list is a container for tasks and an address book is a container for contacts and sub-address books. At 310 a contained types registration table is determined. For each container type, the contained types registration table registers the types of artifacts that can be stored in a container of this container type. At 320, it is determined whether a given artifact is a container. If the artifact is not a container, but is rather an artifact, the method outlined in FIG. 2 is performed to determine the change status of the artifact. At 350 the change status for the container is modified, if necessary, based on the determined change status for the artifact. At 360, a check is made for another artifact. If no other artifacts are in the container, the change status is provided at 370.

If at 320 it is determined that the artifact is a container, at 330 the contained types registration table is queried to return the types of artifacts that can be stored in the container. At 340, the data store is queried for each artifact type that can be found in the container. Then the method loops back to 320 to see if the artifact type is an artifact or another container. If the artifact type is an artifact, the method of FIG. 2 is performed and a change status is returned at 350. If the artifact type is another container, then the method loops back through 330 and 340. In this manner the method loops until it reaches the artifact level for each container within the overall container to return the change status.

In general, for a container, the change status is "new" if the container contains an artifact that has a change status of "new." The change status for a container is "unread" if it doesn't contain any artifacts having a "new" change status, but does contain an artifact having an "unread" change status. The change status for a container is "read" if the container doesn't contain any artifacts having a change status of "new" or "unread."

FIG. 4 illustrates an example embodiment of a data store, an access table, a type registration table, and a contained types registration table that will be referred to in the following examples.

EXAMPLE 1

To return change status for a file type artifact F06 for user007, the type registration table is queried to return the data source for file type artifacts and the access table that logs access information for file type artifacts. The file table is returned as the data source for file type artifacts and the access table A is identified as the access table for file type artifacts. The access table is searched for a F06,user007 row. The row is located and an access time of 120222 is returned. The file table is searched for the F06 and a last modification time of 120356 is returned. The access time and last modification time are compared and since the last access time is earlier than the last modification time, a change status of "unread" is returned.

EXAMPLE 2

To return change status for a file type artifact F06 for user271, the type registration table is queried to return the data source for file type artifacts and the access table that logs access information for file type artifacts. The file table is returned as the data source for file type artifacts and the access table A is identified as the access table for file type artifacts. The access table is searched for a F06,user271 row. The row is located and an access time of 120375 is returned. The file table is searched for the F06 and a last modification time of 120356 is returned. The access time and last modification time are compared and since the last access time is not earlier than the last modification time, a change status of "read" is returned.

EXAMPLE 3

To return change status for a file type artifact F06 for user066, the type registration table is queried to return the data source for file type artifacts and the access table that logs access information for file type artifacts. The file table is returned as the data source for file type artifacts and the access table A is identified as the access table for file type artifacts. The access table is searched for a F06,user066 row. No row is located so a change status of "new" is returned.

EXAMPLE 4

To return change status for a file type artifact F06 for user332, the type registration table is queried to return the data source for file type artifacts and the access table that logs access information for file type artifacts. The file table is returned as the data source for file type artifacts and the access table A is identified as the access table for file type artifacts. The access table is searched for a F06,user332 row. The row is located and an access time of 130561 is returned as well as a value of UNREAD for the user-assignable change attribute. Since the user has given this artifact a change status of UNREAD, a change status of "unread" is returned.

EXAMPLE 5

To return change status for folder type container "projecta" for user271. The contained type registration table is searched for the folder type artifact. Folder and file type artifacts are returned. The type registration table is queried to return the data source for file type artifacts and the access table that logs access information for file type artifacts. The file table is returned as the data source for file type artifacts and the access table A is identified as the access table for file type artifacts. The data store is searched for file type artifacts that are in container projecta. F06 is returned. The access table is searched for a F06,user271 row. The row is located and an access time of 120375 is returned. The file table is searched for the F06 and a modification time of 120356 is returned. The access time and modification time are compared and since the last access time is not earlier than the modification time, a change status of "read" is returned for this artifact. Since there are no other artifacts in the container projecta, "read" is the status for the container. If any sub-folders were contained in projecta, the container change status for each sub-folder would be determined during a determination of the change status for the container.

Figure 5:
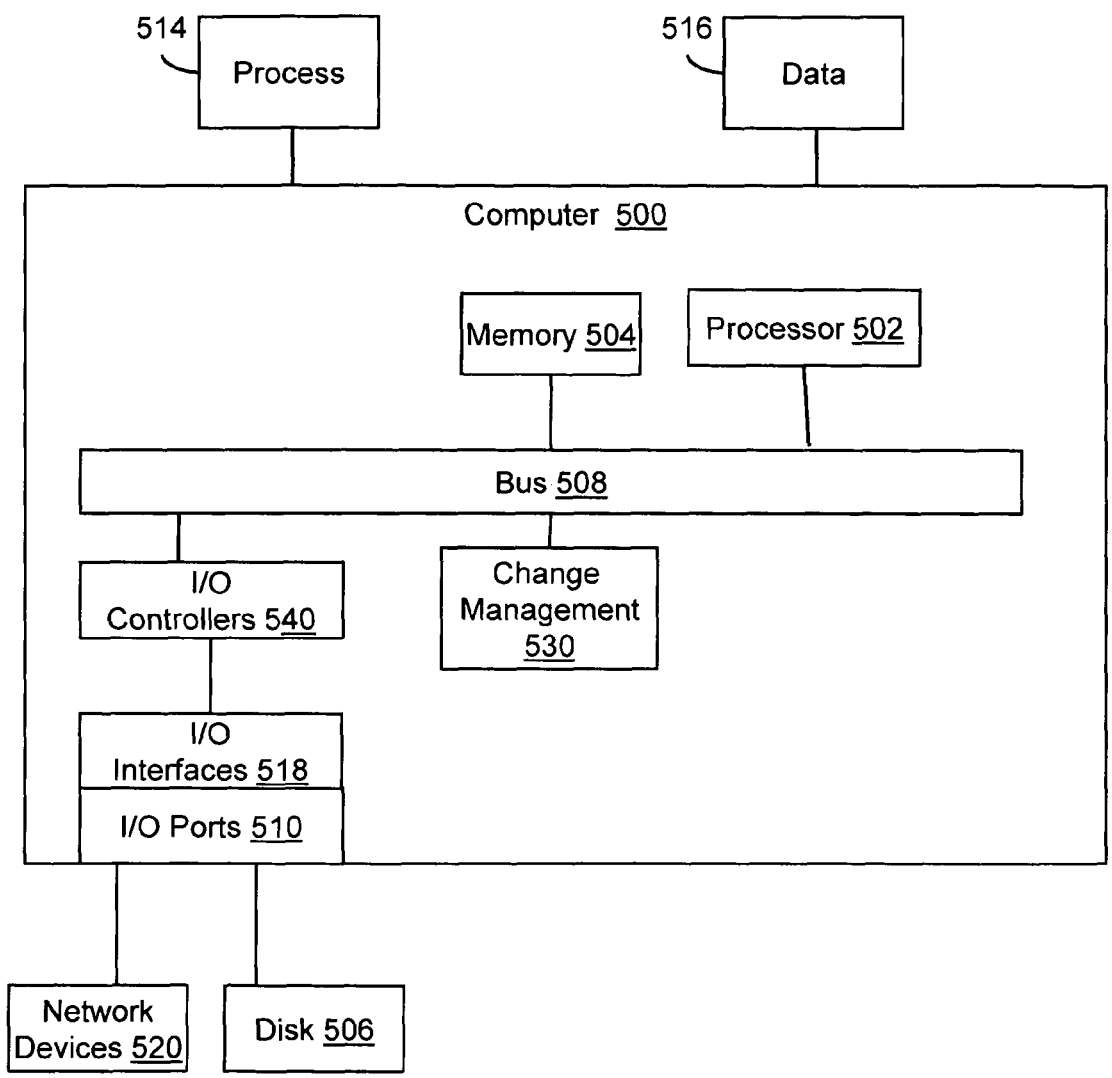
FIG. 5 illustrates an example computing environment in which example systems and methods, and equivalents, may operate.

FIG. 5 illustrates an example computing device in which example systems and methods described herein, and equivalents, may operate. The following acronyms are used with reference to FIG. 10 and are defined as follows:
ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous or static RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a change management system logic 530 configured to facilitate change management. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Thus, logic 530 may provide means (e.g., hardware, software, firmware) for change management.

The means may be implemented, for example, as an ASIC programmed to perform change management. The means may also be implemented as computer executable instructions that are presented to computer 500 as data 516 that are temporarily stored in memory 504 and then executed by processor 502.

Logic 530 may also provide means (e.g., hardware, software, firmware) for change management.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A computer-implemented method that returns a change status for a given user, artifact pair, where the artifact has a unique artifact identifier and an artifact type, and where the given user is selected from at least two users with access to the artifact., the method comprising:
    storing, in a data store an access table that records access information, where the access information includes, for each instance of an artifact being accessed by a user, an access time, a user identifier, and the artifact identifier;
    storing, in the data store, a type registration table that maps artifact types to an artifact data store for the artifact type and an access table that records access information for artifacts of the artifact type;
    with a processor, querying the type registration table to return a data store and access table associated with the artifact type;
    with a processor, querying the access table to return the user's last access time for the artifact;
    if a last access time is returned as a result of the querying of the access table, querying the data store to return a last modification time for the artifact;
    based on the last modification time and the last access time, determining a change status for the given user, artifact pair, wherein the given user is selected from at least two users with access to the artifact; and
    providing the change status for the given user, artifact pair.

2. The computer-implemented method of claim 1 where the determining of the change status is performed by selecting one of read, unread, and new.

3. The computer-implemented method of claim 2 where the determining of the change status is performed by selecting a new change status when the querying of the access table returns no rows.

4. The computer-implemented method of claim 2 where the determining of the change status is performed by selecting a read change status when the user's last access time for the artifact is later than the last modification time for the artifact.

5. The computer-implemented method of claim 2 where the determining of the change status is performed by selecting an unread change status when the user's last access time for the artifact is earlier than that last modification time for the artifact.

6. The computer-implemented method of claim 1 where the querying is performed by generating a dynamic Procedural Language/Structured Query Language (PL/SQL)code query.

7. The computer-implemented method of claim 1 where the access information includes a user-assignable change status attribute; where the querying of the access table includes returning the user-assignable change attribute; and where the determining of the change status for the given user, artifact pair is performed based on the user-assignable change status.

8. The computer-implemented method of claim 7 where the determining of the change status is performed by determining the change status to be the user-assignable change status.

9. The computer-implemented method of claim 1 further comprising:
    constructing a contained artifact type table that maps an artifact container type to artifact types that can be contained within a container of this type;
    receiving a user, container pair;
    accessing the contained artifact type table to determine the types of artifacts that can be contained within the container; and
    returning a change status for the container with respect to the user based on the change status returned for each artifact in the container.

10. A computing system that returns a change status for a given user, artifact pair, where the artifact has a unique artifact identifier and an artifact type, and where the given user is selected from at least two users with access to the artifact, the system comprising:
    an access table construction logic, embodied as computer-executable instructions stored on computer-readable media, the instructions executable by a computer to record access information in an access table, where the access information includes, for each instance of an artifact being accessed by a user, an access time, a user identifier, and the artifact identifier;
    a type registration table construction logic, embodied as computer-executable instructions stored on computer-readable media, the instructions executable by a computer to maintain a type registration table that maps each artifact type to a data store that stores artifacts of the artifact type and an access table that records access information for artifacts of the artifact type;

a query engine to:
determine the artifact type;
generate and execute a query on the type registration table to return a data store identifier and access table identifier that identifies an access table associated with the artifact type;
generate and execute a query on the data store identified by the data store identifier to determine a last modification time for the artifact; and
generate and execute a query on the identified access table to return the user's last access time for the artifact; and
a change status determination logic, embodied as computer-executable instructions stored on computer-readable media, the instructions executable by a computer to determine a change status for the given user artifact pair, wherein the given user is selected from at least two users with access to the artifact based on the last modification time and the last access time and provides the change status to the user.

11. The computing system of claim 10 where the access table includes access information concerning more than one artifact type.

12. The computing system of claim 10 where the access table construction logic includes an interface module that receives a value for a user-assignable change status attribute from a user and records the user-assignable change status value in the access table; and where the query engine generates and executes a query on the access table to return the user-assignable change status value; and further where the change status determination logic determines a change status for the user, artifact pair based on the user-assignable change status value.

13. The computing system of claim 10 further comprising:
a contained artifact type table construction logic, embodied as computer-executable instructions stored on computer-readable media, the instructions executable by a computer to construct a contained artifact type table that maps an artifact container to artifact types that can be contained within the container;
where the query engine is configured to receive a user, container pair and to generate and execute a query on the contained artifact type table to return the artifact types contained within the container; and
where the change status determination logic provides a change status for the container with respect to the user based on the change status returned for each artifact in the container return.

14. The computing system of claim 10 where the one or more data stores comprise an artifact data storage table.

15. The computing system of claim 10 where the one or more data stores comprise a view over an artifact data storage table.

16. A change management system comprising:
one or more artifact data stores that store artifacts having an artifact type, the one or more artifact data stores exposing for query a last modification time for each artifact in the data store;
a change management data store that stores an access table that stores access information that includes an access time, a user identifier, and an artifact identifier for each instance of an artifact being accessed by a user; and a type registration table that maps artifact types to a data store for the artifact type and an access table that records access information for artifacts of the artifact type;
a query engine configured to:
query the type registration table for the artifact type of the given artifact to return a data store identifier and an access table identifier that identifies an access table associated with the artifact type;
query the artifact data store identified by the data store identifier to return a last modification time for the artifact;
query the identified access table to return the user's last access time for the artifact; and
a change status determination logic, embodied as computer-executable instructions stored on non-transitory computer-readable media, the instructions executable by a computer to determine a change status based on the last modification time and the last access time and provides the change status for a given user, artifact pair where the given user is selected from at least two users with access to the artifact.

17. The change management system of claim 16 further comprising:
a contained artifact type table that maps an artifact container type to types of artifacts and sub-containers that can be contained within a container of that type;
where the query engine is configured to receive a user, container pair and to generate and execute a query on the contained artifact type table to return the artifact types contained within the container; and
where the change status determination logic determines a change status for the container with respect to the user based on the change status returned for each artifact in the container.

18. The change management system of claim 16 where the one or more data stores comprise an artifact data storage table.

19. The change management system of claim 16 where the one or more data stores comprise a view over an artifact data storage table.

20. The change management system of claim 16 where the access table includes access information concerning more than one artifact type.

21. The change management system of claim 16 where the access table includes a user-assignable change status attribute; and where the query engine generates and executes a query on the access table to return the user-assignable change status value; and further where the change status determination logic determines a change status for the user, artifact pair based on the user-assignable change status value.

22. A non-transitory computer-readable medium storing computer-executable instructions that when executed by a computer cause the computer to perform a method, the method comprising:
receiving a user, artifact pair, where the artifact has an artifact type and a unique artifact identifier, and further where the given user is selected from at least two users with access to the artifact;
querying a type registration table to return an artifact data store and an access table associated with the artifact type that stores access information that includes an access time, a user identifier, and an artifact identifier for each instance of an artifact being accessed by a user;
querying the artifact data store to return a last modification time for the artifact;
querying the access table to return the user's last access time for the artifact;
determining a change status for the given user, artifact pair, wherein the given user is selected from at least two users with access to the artifact based on the last modification time and the last access time; and
providing the change status for the given user, artifact pair.

23. The non-transitory computer-readable medium of claim 22 where the instructions for determining the change status include determining a new change status when the querying of the access table returns no row.

24. The non-transitory computer-readable medium of claim 22 where the instructions for determining the change status include determining a read change status when the user's last access time for the artifact is later than the last modification time for the artifact.

25. The non-transitory computer-readable medium of claim 22 where the instructions for determining the change status include determining an unread change status when the user's last access time for the artifact is earlier than that last modification time for the artifact.

26. The non-transitory computer-readable medium of claim 22 where the instructions for querying the access table include returning a user-assignable change attribute; and where the instructions for determining of the change status for the given user, artifact pair include determining the change status based on the user-assignable change status.

27. The non-transitory computer-readable medium of claim 22 where the instructions further include:
   receiving a user, container pair;
   accessing a contained artifact type table to determine the types of artifacts and sub-containers that can be contained within the container; and
   returning a change status for the container with respect to the user based on the change status returned for each artifact in the container.

28. A system that returns a change status for a given user, artifact pair, where the artifact has an artifact type and a unique artifact identifier, and further where the given user is selected from at least two users with access to the artifact, the system comprising:
   means, embodied as computer-executable instructions stored on non-transitory computer-readable media, the instructions executable by a computer to record for access information in an access table, where the access information includes an access time, a user identifier, and the artifact identifier for each instance of an artifact being accessed by a user;
   means, embodied as computer-executable instructions stored on non-transitory computer-readable media, the instructions executable by a computer to construct a type registration table that maps artifact types to a data store for the artifact type and an access table that records access information for artifacts of the artifact type;
   means, embodied as computer-executable instructions stored on non-transitory computer-readable media, the instructions executable by a computer to receive the user, artifact pair;
   means, embodied as computer-executable instructions stored on non-transitory computer-readable media, the instructions executable by a computer to query the type registration table to return a data store and access table associated with the artifact type;
   means, embodied as computer-executable instructions stored on non-transitory computer-readable media, the instructions executable by a computer to query the data store to return a last modification time for the artifact;
   means, embodied as computer-executable instructions stored on non-transitory computer-readable media, the instructions executable by a computer to query the access table to return user's last access time for the artifact;
   means, embodied as computer-executable instructions stored on non-transitory computer-readable media, the instructions executable by a computer to determine a change status for the given user, artifact pair based on the last modification time and the last access time; and
   means, embodied as computer-executable instructions stored on non-transitory computer-readable media, the instructions executable by a computer to provide the change status for the given user, artifact pair, wherein the given user is selected from at least two users with access to the artifact.

* * * * *

UNITED STATES PATENT AND TRADEMARK OFFICE
CERTIFICATE OF CORRECTION

| | | |
|---|---|---|
| PATENT NO. | : 8,037,088 B2 | Page 1 of 1 |
| APPLICATION NO. | : 12/317348 | |
| DATED | : October 11, 2011 | |
| INVENTOR(S) | : Chatterjee et al. | |

It is certified that error appears in the above-identified patent and that said Letters Patent is hereby corrected as shown below:

In column 9, line 51, in Claim 1, delete "artifact.," and insert -- artifact, --, therefor.

In column 9, line 52, in Claim 1, delete "store" and insert -- store, --, therefor.

In column 11, line 15, in Claim 10, delete "user" and insert -- user, --, therefor.

Signed and Sealed this
Twenty-seventh Day of December, 2011

David J. Kappos
*Director of the United States Patent and Trademark Office*